United States Patent
Knoerzer et al.

(10) Patent No.: US 7,943,218 B2
(45) Date of Patent: May 17, 2011

(54) ENVIRONMENTALLY-FRIENDLY MULTI-LAYER FLEXIBLE FILM HAVING BARRIER PROPERTIES

(75) Inventors: Anthony Robert Knoerzer, Parker, TX (US); Kenneth Scott Laverdure, Plano, TX (US); Brad Dewayne Rodgers, Frisco, TX (US)

(73) Assignee: Frito-Lay North America, Inc., Plano, TX (US)

( * ) Notice: Subject to any disclaimer, the term of this patent is extended or adjusted under 35 U.S.C. 154(b) by 617 days.

(21) Appl. No.: 12/031,500

(22) Filed: Feb. 14, 2008

(65) Prior Publication Data

US 2008/0160327 A1 Jul. 3, 2008

Related U.S. Application Data

(63) Continuation-in-part of application No. 11/464,331, filed on Aug. 14, 2006, and a continuation-in-part of application No. 11/848,775, filed on Aug. 31, 2007.

(51) Int. Cl.
*B32B 27/00* (2006.01)
*B32B 27/08* (2006.01)
*B32B 27/36* (2006.01)
*B27M 3/00* (2006.01)

(52) U.S. Cl. ............... 428/35.4; 428/34.7; 428/34.8; 428/35.2; 428/35.3; 428/35.6; 428/35.9; 428/36.6; 428/36.7; 428/411.1; 428/480

(58) Field of Classification Search .......... 428/34.1, 428/34.4, 34.6, 34.7, 34.8, 35.2, 35.3, 35.4, 428/35.6, 35.7, 35.8, 35.9, 36.4, 36.6, 36.7, 411.1, 497, 500, 480

See application file for complete search history.

(56) References Cited

U.S. PATENT DOCUMENTS

| | | | |
|---|---|---|---|
| 3,647,111 A | 3/1972 | Stager |
| 4,198,256 A | 4/1980 | Andrews |
| 4,418,841 A | 12/1983 | Eckstein |
| 4,551,371 A | 11/1985 | Eckstein |
| 4,982,872 A | 1/1991 | Avery |

(Continued)

FOREIGN PATENT DOCUMENTS

JP 2000-185381 7/2000

(Continued)

OTHER PUBLICATIONS

Clare Goldsberry, "The Greening of an Industry: PLA film coatings replacing thermoplastics", Modern Plastics Worldwide magazine, Feb. 2007, pp. 54 and 56 (no p. 55), United States.

(Continued)

*Primary Examiner* — Walter B Aughenbaugh
(74) *Attorney, Agent, or Firm* — James R. Gourley; Colin P. Cahoon; Carstens & Cahoon, LLP

(57) ABSTRACT

A multi-layer film with barrier properties having two or more layers made from a bio-based film is disclosed. In one aspect, the print web comprises a bio-based film. In one aspect, the barrier web comprises a bio-based film. In one aspect, a bio-based adhesive adheres the print web to the barrier web. The bio-based film can include paper, PCR, polylactide or polyhydroxy-alkanoate. Unlike prior art petroleum-based films, the bio-based film of the present invention is made from a renewable resource and is biodegradable.

13 Claims, 3 Drawing Sheets

U.S. PATENT DOCUMENTS

| | | | |
|---|---|---|---|
| 5,108,807 A * | 4/1992 | Tucker | 428/35.2 |
| 5,180,765 A | 1/1993 | Sinclair | |
| 5,192,620 A | 3/1993 | Chu | |
| 5,205,473 A | 4/1993 | Coffin, Sr. | |
| 5,216,049 A | 6/1993 | Parker et al. | |
| 5,230,963 A | 7/1993 | Knoerzer | |
| 5,332,586 A | 7/1994 | DiMino | |
| 5,487,940 A | 1/1996 | Bianchini | |
| 5,500,459 A | 3/1996 | Hagemeyer | |
| 5,508,113 A | 4/1996 | Knoerzer | |
| 5,512,338 A | 4/1996 | Bianchini | |
| 5,525,421 A | 6/1996 | Knoerzer | |
| 5,540,962 A | 7/1996 | Suskind | |
| 5,587,048 A * | 12/1996 | Streisel et al. | 162/7 |
| 5,604,042 A | 2/1997 | Bianchini | |
| 5,631,066 A | 5/1997 | O'Brien | |
| 5,731,093 A | 3/1998 | Chang | |
| 5,747,633 A | 5/1998 | Ito et al. | |
| 5,766,637 A | 6/1998 | Shine | |
| 5,776,842 A | 7/1998 | Wood et al. | |
| 5,895,723 A | 4/1999 | Utz | |
| 5,908,918 A | 6/1999 | Chen | |
| 5,985,772 A | 11/1999 | Wood et al. | |
| 6,027,677 A | 2/2000 | Ostapchenko | |
| 6,033,747 A | 3/2000 | Shiotani | |
| 6,071,618 A | 6/2000 | Cook | |
| 6,080,478 A * | 6/2000 | Karhuketo | 428/340 |
| 6,168,857 B1 | 1/2001 | Andersen | |
| 6,200,404 B1 | 3/2001 | Andersen et al. | |
| 6,207,792 B1 | 3/2001 | Gruber | |
| 6,232,389 B1 | 5/2001 | Feeney et al. | |
| 6,235,825 B1 | 5/2001 | Yoshida | |
| 6,245,437 B1 | 6/2001 | Shiiki et al. | |
| 6,248,430 B1 | 6/2001 | Toyoda et al. | |
| 6,294,047 B1 | 9/2001 | Chakar et al. | |
| 6,387,211 B1 | 5/2002 | Chakar et al. | |
| 6,544,607 B1 | 4/2003 | Kuroki et al. | |
| 6,573,340 B1 | 6/2003 | Khemani et al. | |
| 6,576,294 B1 | 6/2003 | Phillips | |
| 6,600,008 B1 | 7/2003 | Kobayashi et al. | |
| 6,645,584 B1 | 11/2003 | Kuusipalo et al. | |
| 6,649,732 B2 | 11/2003 | Kobayashi et al. | |
| 6,660,008 B1 | 12/2003 | Foerster et al. | |
| 6,677,048 B2 | 1/2004 | Karhuketo et al. | |
| 6,716,499 B1 | 4/2004 | Vadhar | |
| 6,740,731 B2 | 5/2004 | Bigg | |
| 6,863,644 B1 | 3/2005 | Cook | |
| 6,942,821 B2 | 9/2005 | Dayrit et al. | |
| 6,977,113 B2 | 12/2005 | Kody et al. | |
| 6,984,443 B2 | 1/2006 | Kuroki et al. | |
| 7,128,969 B2 | 10/2006 | Busch et al. | |
| 7,160,977 B2 | 1/2007 | Hale | |
| 7,172,814 B2 * | 2/2007 | Hodson | 428/479.6 |
| 7,173,080 B2 * | 2/2007 | Yamada et al. | 524/445 |
| 7,214,414 B2 | 5/2007 | Khemani et al. | |
| 7,351,785 B2 | 4/2008 | Matsumoto | |
| 7,514,528 B2 | 4/2009 | Kauffman | |
| 7,718,718 B2 | 5/2010 | Kanzawa | |
| 2002/0160201 A1 | 10/2002 | Ohkura | |
| 2003/0162013 A1 | 8/2003 | Topolkaraev | |
| 2004/0115424 A1 | 6/2004 | Cowton | |
| 2004/0229327 A1 | 11/2004 | Agblevor | |
| 2005/0096422 A1 | 5/2005 | Torkelson et al. | |
| 2005/0194110 A1 | 9/2005 | Richardson | |
| 2006/0019045 A1 | 1/2006 | Bourgeois | |
| 2006/0057260 A1 | 3/2006 | Barry | |
| 2006/0099436 A1 | 5/2006 | Schwark et al. | |
| 2006/0110615 A1 | 5/2006 | Karim et al. | |
| 2006/0194010 A1 | 8/2006 | Hiscock | |
| 2006/0275563 A1 | 12/2006 | Duffy | |
| 2007/0037912 A1 | 2/2007 | Mohanty et al. | |
| 2007/0059541 A1 | 3/2007 | Yoshida et al. | |
| 2007/0184220 A1 | 8/2007 | Cleveland et al. | |
| 2008/0038560 A1 | 2/2008 | Knoerzer | |
| 2009/0061126 A1 | 3/2009 | Knoerzer | |
| 2010/0221560 A1 | 9/2010 | Knoerzer | |

FOREIGN PATENT DOCUMENTS

| | | |
|---|---|---|
| JP | 2003-191425 | 7/2003 |
| JP | 2003276144 | 9/2003 |
| JP | 2004-256570 | 9/2004 |
| JP | 2004-351629 | 12/2004 |
| WO | 2004/093883 | 11/2004 |

OTHER PUBLICATIONS

Matthew M. Malwitz, Sheng Lin-Gibson, Erik K. Hobbie, Paul D. Butler and Gudrun Schmidt, Orientation of Platelets in Multilayered Nanocomposite Polymer Films, Journal of Polymer Science: Part B: Polymer Physics, vol. 41, 3237-3248 (2003) © 2003 Wiley Periodicals, Inc., United States.

J.J. De Vlieger, "Green plastics for food packaging", TNO Industrial Technology, Chapter 24, pp. 519-534, The Netherlands.

Liu Lillian, "Bioplastics in Food Packaging: Innovative Technologies for Biodegradable Packaging," San Jose State University Packaging Engineering, 13 Pages (Feb. 2006).

Kolybaba, M.; "Biodegradable Polymers: Past, Present, and Future" The Society for Engineering in Agricultural, Food, and Biological Systems, Paper No. RRV03-00007 (Oct. 2003), 15 total pages.

NatureWorks LLC PLA Polymer 4032D "Biaxially Oriented Films—High Heat" pp. 1-3, © 2005.

NatureWorks LLC Health and Safety, "Material Safety Data Sheet" pp. 1-10, Jul. 19, 2006.

* cited by examiner

ENVIRONMENTALLY-FRIENDLY MULTI-LAYER FLEXIBLE FILM HAVING BARRIER PROPERTIES

CROSS REFERENCE TO RELATED APPLICATION

This application is a continuation-in-part of co-pending U.S. patent application Ser. No. 11/464,331, filed Aug. 14, 2006, and a continuation-in-part of co-pending U.S. patent application Ser. No. 11/848,775, filed Aug. 31, 2007, the technical disclosures of which are hereby incorporated by reference in their entirety.

BACKGROUND OF THE INVENTION

1. Technical Field

The present invention relates to a biodegradable, bio-based flexible packaging material that can be used in packaging food products and to a method of making the bio-based packaging material.

2. Description of Related Art

Multi-layered film structures made from petroleum-based products originating from fossil fuels are often used in flexible packages where there is a need for its advantageous barrier, sealant, and graphics-capability properties. Barrier properties in one or more layers are important in order to protect the product inside the package from light, oxygen or moisture. Such a need exists, for example, for the protection of foodstuffs, which may run the risk of flavor loss, staling, or spoilage if insufficient barrier properties are present to prevent transmission of such things as light, oxygen, or moisture into the package. In addition, barrier properties also prevent undesirable leaching of the product to the outside of the bag. For example, oily foods such as potato chips have the potential for some oil to leach out into the film of the bag. The sealant properties are important in order to enable the flexible package to form an airtight or hermetic seal. Without a hermetic seal, any barrier properties provided by the film are ineffective against oxygen, moisture, or aroma transmission between the product in the package and the outside. A graphics capability is needed because it enables a consumer to quickly identify the product that he or she is seeking to purchase, allows food product manufacturers a way to label the nutritional content of the packaged food, and enables pricing information, such as bar codes to be placed on the product.

One prior art multi-layer or composite film used for packaging potato chips and like products is illustrated in FIG. 1 which is a schematic of a cross section of the multi-layer film 100 illustrating each individual substantive layer. Each of these layers functions in some way to provide the needed barrier, sealant, and graphics capability properties. For example, the graphics layer 114 is typically used for the presentation of graphics that can be reverse-printed and viewed through a transparent outer base layer 112. Like numerals are used throughout this description to describe similar or identical parts, unless otherwise indicated. The outer base layer 112 is typically oriented polypropylene ("OPP") or polyethylene terephthalate ("PET"). A metal layer disposed upon an inner base layer 118 provides the required barrier properties. It has been found and is well-known in the prior art that by metallizing a petroleum-based polyolefin such as OPP or PET reduces the moisture and oxygen transmission through the film by approximately three orders of magnitude. Petroleum-based OPP is typically utilized for the base layers 112 118 because of its lower cost. A sealant layer 119 disposed upon the OPP layer 118 enables a hermetic seal to be formed at a temperature lower than the melt temperature of the OPP. A lower melting point sealant layer 119 is desirable because melting the metallized OPP to form a seal could have an adverse effect on the barrier properties. Typical prior art sealant layers 119 include an ethylene-propylene co-polymer and an ethylene-propylene-butene-1 ter-polymer. A glue or laminate layer 115, typically a polyethylene extrusion, is required to adhere the outer base layer 112 with the inner, product-side base layer 118. Thus, at least two base layers of petroleum-based polypropylene are typically required in a composite or multi-layered film.

Other materials used in packaging are typically petroleum-based materials such as polyester, polyolefin extrusions, adhesive laminates, and other such materials, or a layered combination of the above.

FIG. 2 demonstrates schematically the formation of material, in which the OPP layers 112, 118 of the packaging material are separately manufactured, then formed into the final material 100 on an extrusion laminator 200. The OPP layer 112 having graphics 114 previously applied by a known graphics application method such as flexographic or rotogravure is fed from roll 212 while OPP layer 118 is fed from roll 218. At the same time, resin for PE laminate layer 115 is fed into hopper 215a and through extruder 215b, where it will be heated to approximately 600° F. and extruded at die 215c as molten polyethylene 115. This molten polyethylene 115 is extruded at a rate that is congruent with the rate at which the petroleum-based OPP materials 112, 118 are fed, becoming sandwiched between these two materials. The layered material 100 then runs between chill drum 220 and nip roller 230, ensuring that it forms an even layer as it is cooled. The pressure between the laminator rollers is generally set in the range of 0.5 to 5 pounds per linear inch across the width of the material. The large chill drum 220 is made of stainless steel and is cooled to about 50-60° F., so that while the material is cooled quickly, no condensation is allowed to form. The smaller nip roller 230 is generally formed of rubber or another resilient material. Note that the layered material 100 remains in contact with the chill drum 220 for a period of time after it has passed through the rollers, to allow time for the resin to cool sufficiently. The material can then be wound into rolls (not specifically shown) for transport to the location where it will be used in packaging. Generally, it is economical to form the material as wide sheets that are then slit using thin slitter knives into the desired width as the material is rolled for shipping.

Once the material is formed and cut into desired widths, it can be loaded into a vertical form, fill, and seal machine to be used in packaging the many products that are packaged using this method. FIG. 3 shows an exemplary vertical form, fill, and seal machine that can be used to package snack foods, such as chips. This drawing is simplified, and does not show the cabinet and support structures that typically surround such a machine, but it demonstrates the working of the machine well. Packaging, film 310 is taken from a roll 312 of film and passed through tensioners 314 that keep it taut. The film then passes over a former 316, which directs the film as it forms a vertical tube around a product delivery cylinder 318. This product delivery cylinder 318 normally has either a round or a somewhat oval cross-section. As the tube of packaging material is pulled downward by drive belts 320, the edges of the film are sealed along its length by a vertical sealer 322, forming a back seal 324. The machine then applies a pair, of heat-sealing jaws 326 against the tube to form a transverse seal 328. This transverse seal 328 acts as the top seal on the bag 330 below the sealing jaws 326 and the bottom seal on the bag 332 being filled and formed above the jaws 326. After the transverse seal 328 has been formed, a cut is made across the sealed area to separate the finished bag 330 below the seal 328 from the partially completed bag 332 above the seal. The film tube is then pushed downward to draw out another package length. Before the sealing laws form each transverse seal, the product to be packaged is dropped through the product delivery cylinder 318 and is held within the tube above the transverse seal 328.

Petroleum-based prior art flexible films comprise a relatively small part of the waste produced when compared to other types of packaging. Thus, it is uneconomical to recycle because of the energy required to collect, separate, and clean the used flexible film packages. Further, because the petroleum films are environmentally stable, petroleum based films have a relatively low rate of degradation. Consequently, discarded packages that become inadvertently dislocated from intended waste streams can appear as unsightly litter for a relatively long period of time. Further, such films can survive for long periods of time in a landfill. Another disadvantage of petroleum-based films is that they are made from oil, which many consider to be a limited, non-renewable resource. Further, the price of petroleum-based films is volatile since it is tied to the price of oil. Consequently, a need exists for a biodegradable flexible film made from a renewable resource. In one embodiment, such film should be food safe and have the requisite barrier properties to store a low moisture shelf-stable food for an extended period of time without the product staling. The film should have the requisite sealable and coefficient of friction properties that enable it to be used on existing vertical form, fill, and seal machines.

SUMMARY OF THE INVENTION

The present invention is directed towards a multi-layer film having barrier properties wherein each of two or more layers comprises a bio-based film. In one aspect, the multi-layer packaging film of the present invention has an outer layer comprising a bio-based film, an adhesive layer adhered to the outer layer and a product side layer comprising a bio-based film having barrier properties. In one aspect, the bio-based film is selected from a paper comprising post consumer recycled fiber, polylactide (PLA), and polyhydroxy-alkanoate (PHA). In one aspect, the adhesive layer comprises a bio-based film. The present invention thereby provides a multi-layer film with barrier properties that is substantially made from renewable resources. Further, in one embodiment, a substantial portion of the film is biodegradable. The above as well as additional features and advantages of the present invention will become apparent in the following written detailed description.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

One embodiment of the present invention is directed towards use of a bio-based film as at least two of the film layers in a multi-layer flexible film packaging. As used herein, the term "bio-based film" means a polymer film where at least 80% of the polymer film by weight is derived from a non-petroleum or biorenewable feedstock. In one embodiment up to about 20% of the bio-based film can comprise a conventional polymer sourced from petroleum One problem with bio-based plastic films is that such films have poor moisture barrier and oxygen barrier properties. As a result, such films heretofore could not be used exclusively in packaging. Further, many biodegradable films are brittle and stiffer than OPP typically used for flexible film packages. The handling of containers made exclusively from biodegradable films is therefore relatively noisy as compared to prior art petroleum-based films. Many of these problems can minimized or eliminated by using a "hybrid" film.

One embodiment of the present invention is directed towards use of a bio-based film comprising recycled material as at least one of the film layers in a multi-layer flexible film packaging. In one embodiment, the present invention is directed towards a flexible film comprising an outer paper layer comprising post consumer reclaim ("PCR") fibers. As used herein the term "PCR fibers" refers to fibers that are made from recycled paper. As used herein, the term "PCR paper" refers to paper made from a cellulose-based material that comprises PCR fibers.

Figure 4A:
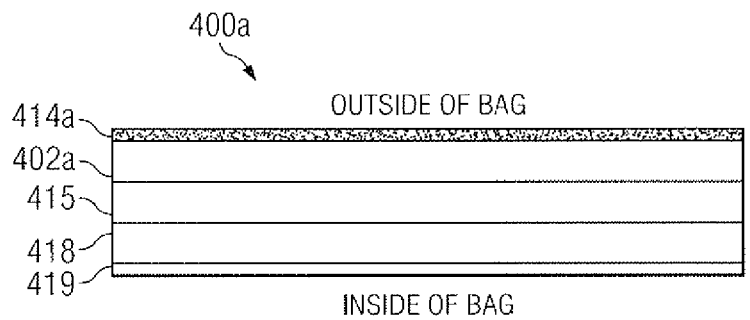
FIG. 4a depicts a magnified schematic cross-section of a hybrid multi-layer packaging film made according to one embodiment of the invention.

FIG. 4a depicts a magnified schematic cross-section of a multi-layer packaging film 400a made with recycled materials according to one embodiment of the invention. The multi-layer film 400a depicted in FIG. 4a is a hybrid film because it comprises both a biodegradable, bio-based film comprising recycled materials in the form of PCR paper 402a and a stable, metalized OPP film 418. Examples of metalized OPP films 418 having a sealant layer 419 that can be used in accordance with the present invention include PWX-2, PWX-4, PWS-2 films available from Toray Plastics of North Kingstown, R.I. or MU-842, Met HB, or METALLYTE films available from Exxon-Mobil Chemical.

In the embodiment shown in FIG. 4a, the outer base layer 402a comprises PCR paper. In one embodiment, the outer base layer 402a comprises food-safe PCR paper. As used herein, "food-safe PCR paper" is defined as the absence of any harmful or deleterious materials (such as 'fluorescent whitening agents') that can migrate to food products from recycled papers used for food packaging. U.S. Food and Drug Administration regulation 21 CFR 176.260 prohibits the presence of any harmful or deleterious materials that can migrate to food products from recycled papers used for food packaging. Food-safe PCR paper can be made from recycled paper-based feedstocks, as illustrated by U.S. application Publication No. 2005/0194110 and U.S. Pat. Nos. 6,294,047 and 6,387,211. Any reference in this specification to "PCR paper" is meant to also explicitly encompass "food safe PCR paper."

PCR paper fibers can be added to the virgin paper fibers during typical and conventional paper making processes during the wet mixing stage. The PCR fibers or PCR and virgin fibers are dried across a drum roll to form the paper sheet. The PCR fibers thereby replace a portion of all of the virgin fibers. In one embodiment, the outer base layer 402a comprises PCR paper which further comprises between about 5% and about 100% PCR fiber by weight of the outer base layer 402. Further, in one embodiment, the present invention comprises a multi-layer film 400a comprising PCR paper, wherein the multi-layer film 400a comprises between about 1.25% and about 70% PCR fibers by total weight of the multi-layer film 400a.

Unlike plastic sheets of film where the thickness of the film is measured in "gauge", the thickness of paper is measured in pounds per ream and refers to the weight of 432,000 square inches of film. In one embodiment, the outer base layer 402a comprises between about 15 pounds and about 30 pounds per ream. In one embodiment, the PCR paper comprises between about 25% and about 70% and more preferably about 50% by weight the laminate film 400a.

A sheet of PCR paper can be processed like most thermoplastic polymers into a multi-layer film. For example, in one embodiment, the PCR paper is sent to a converter for printing and lamination. Referring again to FIG. 4a, a graphic image 414a is printed on the outer-facing of the outer base layer 402a. Printing can take place via any number of conventional printing processes (flexographic, rotogravure, off-set, etc.). One problem with recycled paper films is that such films have poor moisture barrier and oxygen barrier properties. As a result, such films cannot currently be used exclusively in packaging low moisture shelf stable food products. Consequently, a laminate layer 415 can be used to "glue" the PCR paper sheet 402a to a metalized OPP film 418 or other barrier property layer having a sealant layer 419 with either conventional extrusion lamination (using molten polyethylene or similar material) or with adhesive lamination (either solvent or solvent-less).

In the embodiment shown in FIG. 4a, the inside sealant layer 419 can be folded over and then sealed on itself to form a tube having a fin seal for a backseal. The fin seal is accomplished by the application of heat and pressure to the film. Alternatively, a thermal stripe can be provided on the requisite portion of the PCR sheet 402a adjacent or on top of the graphics layer 414 to permit a lap seal to be used.

Figure 1:
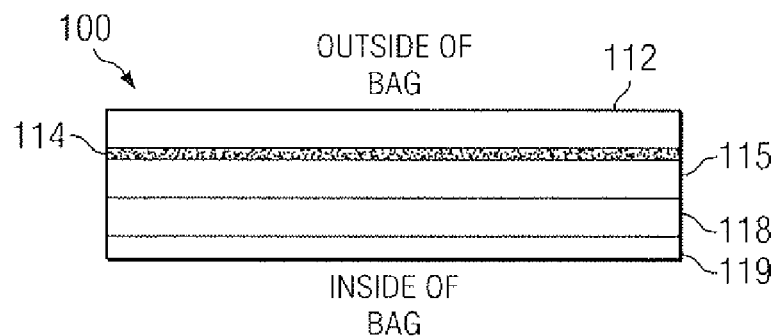
FIG. 1 depicts a cross-section of an exemplary prior art packaging film.
Figure 2:
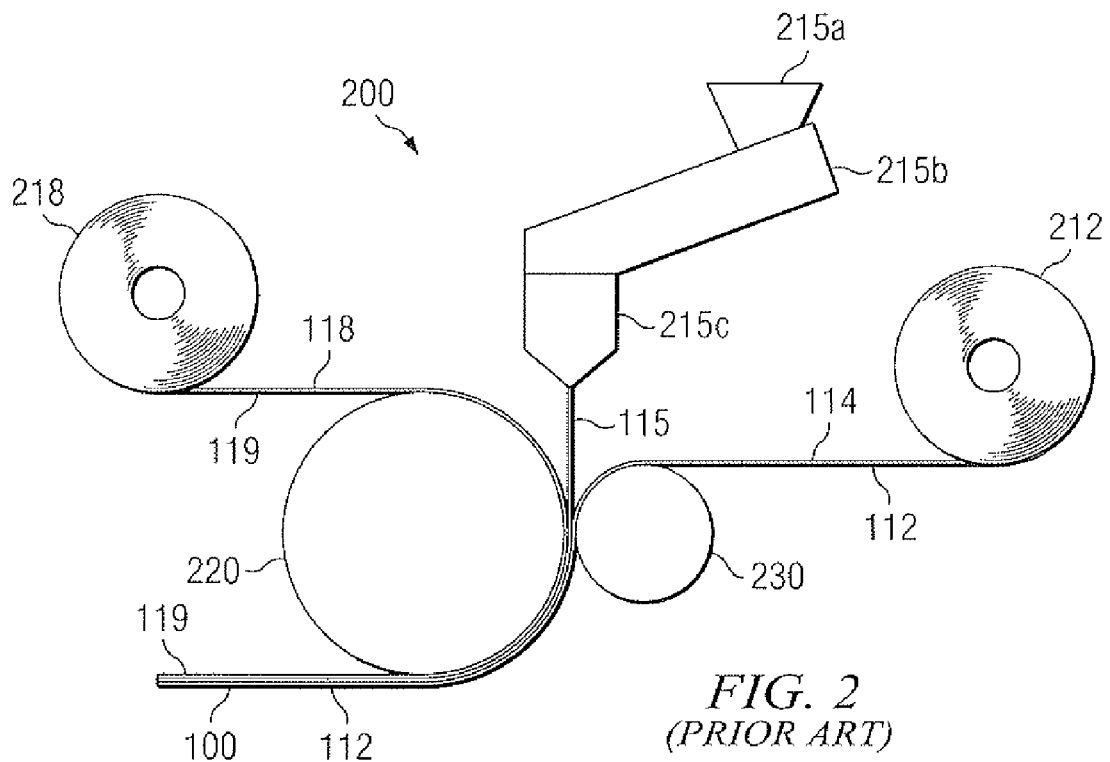
FIG. 2 depicts the exemplary formation of a prior art packaging film.
Figure 3:
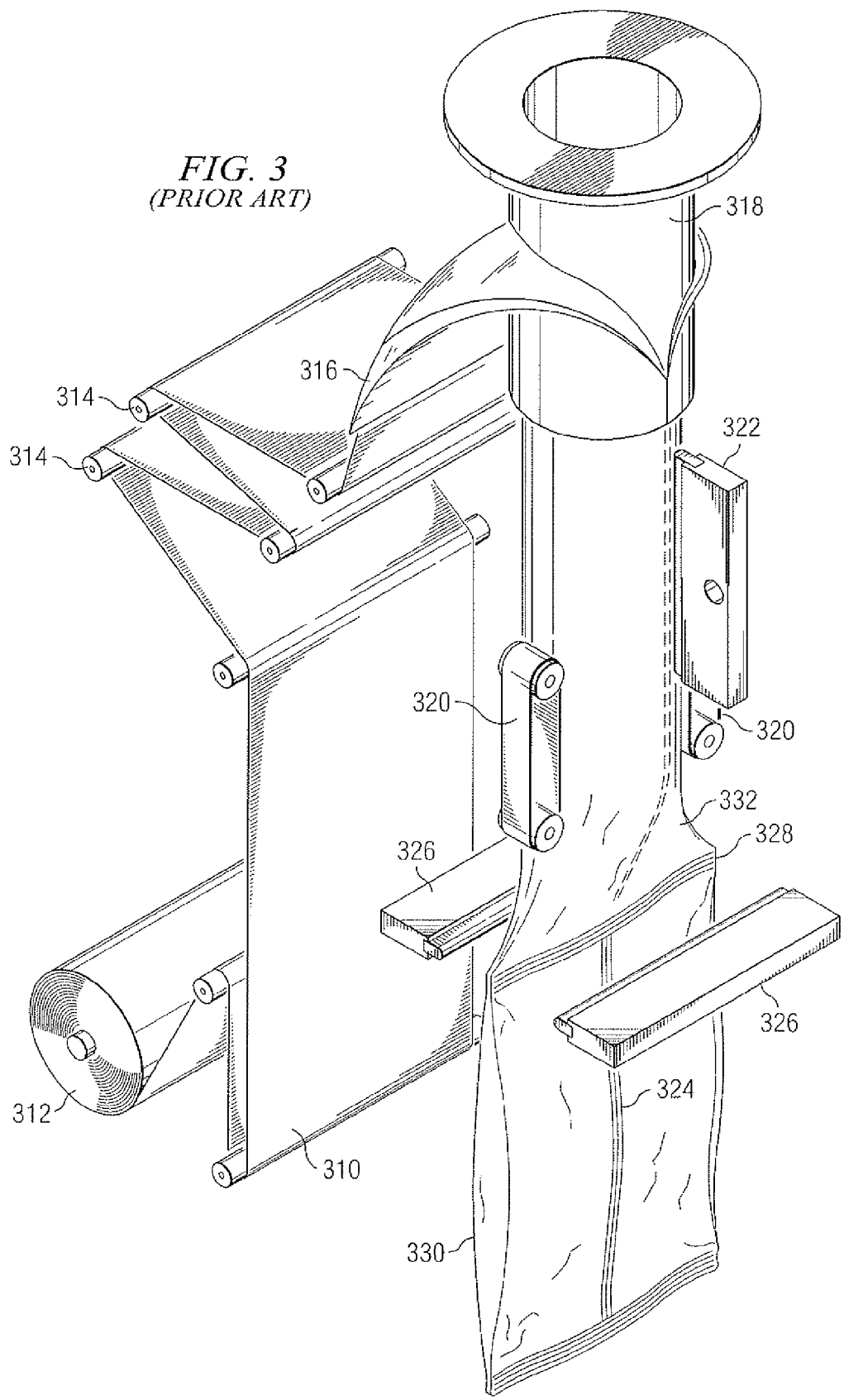
FIG. 3 depicts a vertical form, fill, and seal machine that is known in the prior art.

Whereas the prior art outside film 112, laminate layer 115 and inner base layer 118 (as shown in FIG. 1) roughly were each one-third of the package film by weight, in one embodiment, the multi-layer film 400a of the present invention comprises an outside PCR paper 402a (as shown in FIG. 4a) of 50% by weight of the multi-layer film 400a. Consequently, less OPP film can be used than is required in the prior art reducing consumption of fossil fuel resources.

In one embodiment, the total thickness of polyolefin films used in the laminate layer 415, and in the metalized OPP layer 418 and sealant layer 419 is less than 2.0 mils and more preferably less than about 1.5 mils. For example, referring to FIG. 4a, in one embodiment, the laminate layer 415 comprises a thickness of about 70 gauge, and the metalized OPP layer 418 and sealant layer combined comprises a thickness of about 70 gauge, resulting in a total polyolefin thickness of about 1.4 mils.

In one embodiment, the present invention provides a film comprising PCR paper wherein the film has between 25% and 70% less polyolefins than prior art films yet comprises acceptable oxygen and moisture barrier properties. As used herein, a film having acceptable oxygen barrier properties has an oxygen transmission rate of less than about 150 cc/m$^2$/day (ASTM D-3985). As used herein, a film having acceptable moisture barrier properties comprises a water vapor transmission rate of less than about 5 grams/m$^2$/day (ASTM F-1249). As used herein, a barrier property layer comprises a film having acceptable moisture and oxygen barrier properties.

Figure 4B:
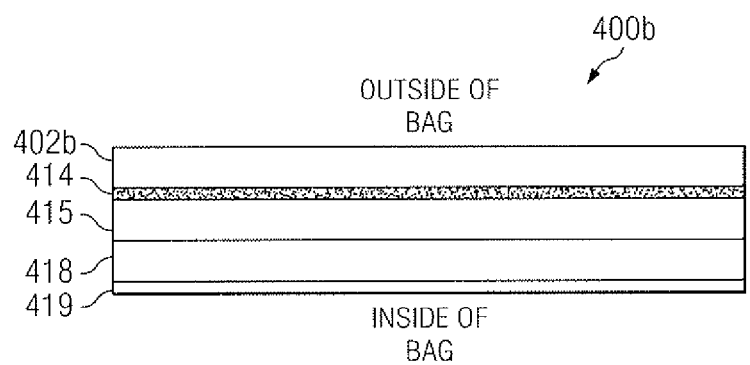
FIG. 4b depicts a magnified schematic cross-section of a hybrid multi-layer packaging film made according to one embodiment of the invention.

FIG. 4b depicts a magnified schematic cross-section of a hybrid multi-layer packaging film 400b made according to one embodiment of the invention. Here, the outer transparent base layer comprises a biodegradable, bio-based film 402b in place of an oriented petroleum-based polypropylene 112 depicted in FIG. 1.

In one embodiment, the biodegradable, bio-based film 402b comprises polylactic acid, also known as polylactide ("PLA"), which is a biodegradable, thermoplastic, aliphatic polyester derived from lactic acid. PLA can be easily produced in a high molecular weight form through ring-opening polymerization of lactide/lactic acid to PLA by use of a catalyst and heat.

PLA can be made from plant-based feedstocks including soybeans, as illustrated by U.S. Patent Application Publication Number 20040229327 or from the fermentation of agricultural by-products such as corn starch or other plant-based feedstocks such as corn, wheat, or sugar beets. PLA can be processed like most thermoplastic polymers into a film. PLA has physical properties similar to PET and has excellent clarity. PLA films are described in U.S. Pat. No. 6,207,792 and PLA resins are available from Natureworks LLC (http://www.natuureworksllc.com) of Minnetonka, Minn. PLA degrades into carbon dioxide and water.

In one embodiment, the biodegradable, bio-based film 402b comprises polyhydroxy-alkanoate ("PHA"), available from Archer Daniels Midland of Decatur, Ill. PHA is a polymer belonging to the polyesters class and can be produced by microorganisms (e.g. *Alcaligenes eutrophus*) as a form of energy storage. In one embodiment, microbial biosynthesis of PHA starts with the condensation of two molecules of acetyl-CoA to give acetoacetyl-CoA which is subsequently reduced to hydroxybutyryl-CoA. Hydroxybutyryl-CoA is then used as a monomer to polymerize PHB, the most common type of PHA.

The laminate film depicted in FIG. 4b can be made by extruding a biodegradable bio-based film 402b into a film sheet. In one embodiment, the bio-based film 402b has been oriented in the machine direction or the transverse direction. In one embodiment, the bio-based film 402b comprises a biaxially oriented film. Such biaxially oriented film is available as a PLA film from SKC Ltd. of South Korea. In one embodiment, PLA film 402b used comprises a thickness of between about 70 gauge and about 120 gauge. Although PLA film is the bio-based film most often referred to in this application, such film is provided only as an example of a bio-based film and the disclosure should in no way be interpreted as being limited to PLA. Consequently, the terms "PLA film" and "bio-based film" should be construed as interchangeable throughout the specification unless specific properties of PLA are being addressed. A graphic image 414 is reverse printed onto the biodegradable, bio-based film 402b by a known graphics application method such as flexographic or rotogravure to form a graphics layer 414. This graphics layer 414 can then be "glued" to the product-side metalized OPP film 418, by a laminate layer 415, typically a polyethylene extrusion. Thus, the prior art OPP print web is replaced with a biodegradable print web. In one embodiment, the bio-based film 402b comprises multiple layers to enhance printing and coefficient of friction properties. In one embodiment, the bio-based film 402b comprises one or more layers of PLA.

In the embodiment shown in FIG. 4b, the inside sealant layer 419 can be folded over and then sealed on itself to form a tube having a fin seal for a backseal. The fin seal is accomplished by the application of heat and pressure to the film. Alternatively, a thermal stripe can be provided on the requisite portion of the bio-based film 402b to permit a lap seal to be used.

Examples of metalized OPP films 418 having a sealant layer 419 that can be used in accordance with the present invention include PWX-2, PWX-4, PWS-2 films available from Toray Plastics of North Kingstown, R.I. or MU-842, Met HB, or METALLYTE films available from Exxon-Mobil Chemical.

The laminate of film depicted in FIG. 4b is a hybrid film because it comprises both a biodegradable, bio-based film 402b and a stable, metalized OPP film 418. However, one benefit of the present invention is that the outer PLA film 402b can be made thicker than prior art outer films to maximize the use of bio-based films 402b and the biodegradability of the overall package while preserving "bag feel" properties that consumers have become so well known to consumers. For example, whereas the prior art outside film 112, laminate layer 115 and inner base layer 118 roughly were each one-third of the package film by weight, in one embodiment, the laminate of the present invention comprises an outside bio-based film 402b of 50% by weight, a laminate layer 415 being 20% by weight and an inner base OPP layer 418 of about 30% by weight of the total packaging film. Consequently, less OPP film 418 can be used than is required in the prior art reducing consumption of fossil fuel resources. In one embodiment, the present invention provides a hybrid film having at least about one-quarter less and preferably between about one-third and one-half less fossil fuel-based carbon than a prior art film, yet comprises acceptable barrier properties.

There are several advantages provided by the hybrid film depicted in FIG. 4b. First, biodegradable films 402b such as PLA make excellent print webs. Unlike polypropylene, PLA has oxygen in the backbone of the molecule. The oxygen inherently provides high surface energy that facilitates ink adhesion, thereby reducing the amount of pre-treatment required to prepare the film for print as compared to prior art petroleum-based OPP films. Second, the film can be produced using the same existing capital assets that are used to make prior art films. Third, the hybrid film uses 25% to 50% less petroleum than prior art films. Fourth, the film is partially degradable which can help to reduce unsightly litter.

Figure 5A:
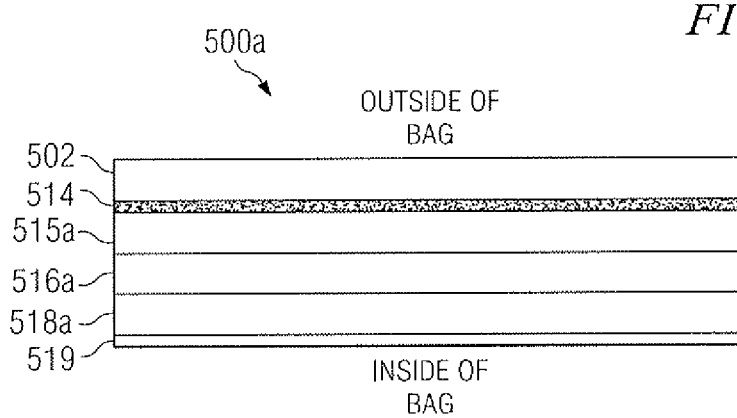
FIG. 5a depicts a magnified schematic cross-section of a multi-layer packaging film made according to one embodiment of the invention.

FIG. 5a depicts a magnified schematic cross-section of a multi-layer packaging film made according to one embodiment of the invention. Here, the inner base layer comprises a thin metalized barrier/adhesion improving film layer 516a adjacent to a biodegradable, bio-based film 518a such as PLA instead of an oriented polypropylene 118 418 depicted in FIG. 1 and FIG. 4a, and FIG. 4b.

A tie layer (not shown) can be disposed between the metalized barrier/adhesion improving film layer 516a and the bio-based film layer 518a. A tie layer can permit potentially incompatible layers to be bonded together. The tie layer can be selected from malic anhydride, ethylenemethacrylate ("EMA"), and ethylenevinylacetate ("EVA").

The metalized barrier/adhesion improving film layer 516a adjacent to the bio-based film 518a can be one or more polymers selected from polypropylene, an ethylene vinyl alcohol ("EVOH") formula, polyvinyl alcohol ("PVOH"), polyethylene, polyethylene terephthalate, nylon, and a nano-composite coating. The metalized barrier/adhesion improving layer 516a can be adhered to the bio-based print web 502 with any suitable adhesive 515a such as LDPE.

Below depicts EVOH formulas in accordance with various embodiments of the present invention.

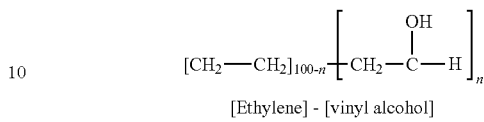

[Ethylene] - [vinyl alcohol]

The EVOH formula used in accordance with the present invention can range from a low hydrolysis EVOH to a high hydrolysis EVOH. As used herein a low hydrolysis EVOH corresponds to the above formula wherein $n=25$. As used herein, a high hydrolysis EVOH corresponds to the above formula wherein $n=80$. High hydrolysis EVOH provides oxygen barrier properties but is more difficult to process. When metalized, EVOH provides acceptable moisture barrier properties. The EVOH formula can be coextruded with the PLA 518 and the EVOH formula can then be metalized by methods known in the art including vacuum deposition.

In one embodiment, the metalized film 516 comprises a metalized PET 516 that is less than about 10 gauge and preferably between about 2 and about 4 gauge in thickness. The PET can be coextruded with the PLA 518 and the PET can then be metalized by methods known in the art. In one embodiment, the metalized film 516 comprises a PVOH coating that is applied to the PLA as a liquid and then dried.

In one embodiment, one or both bio-based films 502 518 consists of only PLA. Alternatively, additives can be added to the print web bio-based film 502 or the barrier web bio-based film 518 during the film making process to improve film properties such as the rate of biodegradation. For example, the rate of degradation of biodegradable PLA is relatively slow. Consequently, pieces of litter are still visible for a period of time. To accelerate breakdown of PLA, starch can be added to the base polymer to improve the biodegradability of the final film. In one embodiment, one or both bio-based films 502 518 comprises about 1% to about 65% starch by weight of the film. The starch will cause the oriented PLA film to breakdown into smaller pieces (roughly akin to one chewing food). These smaller pieces will then be far less visible in the environment as litter and will as degrade faster due to the larger surface area because the larger edge area allows moisture to seep in between the multi-layer film layers and breaks down the layers faster. Although starch addition discussed above is in relation to the two base layers 502 518, starch can be incorporated into any bio-based layer, including any bio-based adhesive layer discussed below. Starch can also be incorporated in any extruded tie/adhesive layer.

In one embodiment, the starch used comprises starch reclaimed from a processed food product. For example, when potatoes are sliced to make potato chips, tile sliced potatoes are often washed to remove surface starch prior to frying the potato slices to prevent the potato slices from sticking together. The starch that is washed off from the potato slices can be reclaimed and incorporated into any PLA-based layer. Consequently, such embodiment advantageously both reduces waste disposal costs and at the same time reduces the amount of PLA needed for the packaging film because a portion of the film can be made from reclaimed potato starch. Because the starch and the PLA are both biological polymers, they are compatible. Of course, such example of reclaimed starch is provided for purposes of illustration and not limitation.

A PLA based film ultimately breaks down into $CO_2$ and $H_2O$. Degradation of bio-based films can also be enhanced by adding various Transition metal stereates (Cobalt, Nickel, etc) but use of a starch would be preferred as it would also break down and leave no residual. In one embodiment, one or both bio-based films 502 518 comprises up to about 5% of a stearate additive by weight of the film. One or more stearate additives can be selected from aluminum, antimony, barium, bismuth, cadmium, cerium, chromium, cobalt, copper, gallium, iron, lanthanum, lead, lithium, magnesium, mercury, molybdenum, nickel, potassium, rare earths, silver, sodium, strontium, tin, tungsten, vanadium, yttrium, zinc or zirconium. Such additives are marketed under the TDPA tradename and are available from EPI of Conroe, Tex., USA. In one embodiment, one or both bio-based films 502 518 comprises a photocatalyst. Photocatalysts are known in the art and are typically used in 6-pack beverage can container rings to facilitate breakdown upon exposure to sunlight.

Further, one or more suitable co-polymer additives can be used selected from ethylene methlacrylate and styrene-butydiene block co-polymer (e.g., tradename KRATON) as a compatilizer to improve the degree of compatibility between the bio-based film 502 518 and other film layers. For example, such co-polymer additives can be used to improve the heat seal characteristics of the laminate film. The co-polymer additives can also improve the lamination bond strength to help the biodegradable film print web to better adhere to an OPP barrier web, or to help the bio-based film print web to better adhere to a bio-based barrier web. Additives can also be used such that a biodegradable adhesive, e.g., the laminate layer, can be used. An optional sealant layer 519 can also be provided.

Whereas the prior art outside film 112, laminate layer 115 and inner base layer 118 (as shown in FIG. 1) roughly were each one-third of the package film by weight, in one embodiment, the multi-layer film 500a of the present invention comprises two bio-based layers 502 518 (as shown in FIG. 5a) that together constitute between about 35% to about 75% by weight of the multi-layer film 500a. Consequently, one embodiment of the present invention provides a bio-based multi-layer film comprising two bio-based film layers wherein the multi-layer film has over 60% less fossil fuel-based polyolefins than prior art films, provides a biodegradable film, yet comprises acceptable oxygen and moisture barrier properties.

In one embodiment of the multi-layer film 500a depicted in FIG. 5a, the total thickness of polyolefin films used in the laminate layer 515a is about 70 gauge or less, resulting in a total polyolefin thickness of less than about 0.7 mils.

Figure 5B:
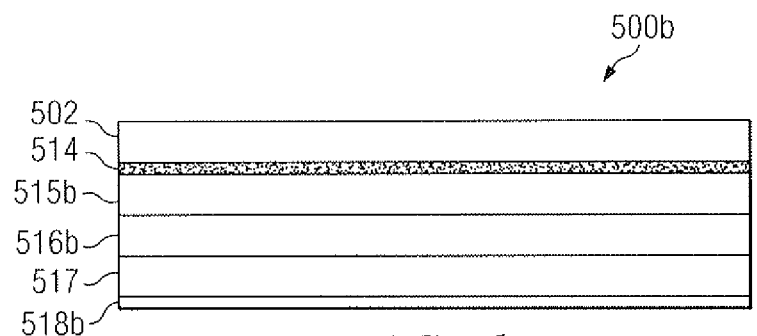
FIG. 5b depicts a magnified schematic cross-section of a multi-layer packaging film made according to one embodiment of the invention

FIG. 5b depicts a magnified schematic cross-section of a multi-layer packaging film made according to one embodiment of the invention. Here, the multi-layer film comprises a bio-based adhesive 515b. As used herein, the term "bio-based adhesive" means a polymer adhesive where at least about 80% of the polymer layer by weight is derived from a non-petroleum or biorenewable feedstock. The adhesive layer 515b can comprise any suitable biodegradable adhesive such as a modified PLA biopolymer 26806 available from DaniMer Scientific LLC of Bainbridge, Ga or Mater Bi available from Novamont of Novara, Italy. In one embodiment, a starch based glue can be used.

Additives can also help to metalize a biodegradable film via conventional aluminum vapor deposition processes to make a biodegradable barrier web that provides barrier performance for the biodegradable film. Biodegradable films and bio-based films, such as PLA, are notorious for having, poor barrier properties. As used herein, the term "additives" is not limited to chemical additives and can include surface treatment including, but not limited to, corona treatment.

In one embodiment, the bio-based film 518b comprises a nanocoating 517 to provide barrier protection. As used herein, a nanocoating comprises a nanoclay, a nanocomposite or nanocomposite coating and any necessary binder. Nanocomposites are known in the art as exemplified by U.S. Pat. No. 7,223,359, which is hereby incorporated by reference. In one embodiment, the bio-based film comprises a nanoclay to provide barrier properties. Nanoclays in accordance with the present invention comprise layered silicate platelets such as vermiculite, aluminosilicates, zeolites, bentonite, montmorillonite, kaolinite, bauxite, nontronite, beidellite, volkonskoite, hectorite, sponite, laponite, sauconite, hydrous mica, chlorite, magadiite, kenyaite, ledikite and mixtures thereof. Multiple polymer matrices known in the art can be used as a binder to "glue" the nanoclay or nanocomposite constituents together including, but not limited to an acrylic emulsion, styrene-acrylics, and polyurethanes.

Nanocoatings advantageously provide nanoparticles in a structure on a microscopic level having a flat, thin very large aspect ratio that inhibits other molecules such as oxygen and water vapor from penetrating the structure.

In one embodiment, a nanocoating or nanoclay can be added in the same type of graphics application method presently used to apply an ink layer to a web of film. U.S. Pat. No. 6,232,389, which is hereby incorporated by reference in its entirety, for example, discloses a coating composition which contains substantially dispersed exfoliated layered silicates in an elastomeric polymer that can be applied as a coating and dried. In one embodiment, the coating is applied at a rate of less than about 15 grams of coating per square meter of area, more preferably less than about 10 grams/$m^2$ and even more preferably less than about 8 grams/$m^2$. The free oxygen of PLA means that it has a natural affinity for application of such coatings. In one embodiment, the nanoclay is added to the bio-based film as an additive during film production.

In one embodiment, the layered silicate platelets of the nanocomposite comprise an aluminium-silicate that forms a substantially cylindrical or spherical structure. Hundreds of these structures can be coupled together can form long, thin tubes that are very difficult for oxygen or water molecules to penetrate. In one embodiment, the nanocomposite comprises a pore size sufficient such that the navigation of an oxygen and/or water molecule through the nanocomposite pore is sufficiently retarded to preserve the shelf-life of a low moisture food ingredient, such as a potato chip for two or more months in a biodegradable laminate bag comprising a nanocomposite for barrier properties. In one embodiment, the platelets are bound so tightly together that there are virtually no tube openings for the oxygen or water molecules to enter. In one embodiment, the nanocomposite comprises a scavenger that reacts with oxygen or water. In one embodiment, the nanocomposite comprises a scavenger such as iron.

In one embodiment, the barrier layer comprises a metalized nanocoating. For example, a nanocoating 517 such as a nanoclay or a nanocomposite can be applied to any suitable film layer 518b by any suitable method. Aluminum or other suitable material can then be applied by vapor deposition methods known in the art to provide a metalized layer 516b over the nanocoating 517. Because PLA is a hygroscopic thermoplastic, the PLA film easily swells upon contact with moisture. Consequently, a metalized coating placed directly onto a PLA film has a very high potential to crack after metallization when the adjacent PLA layer is exposed to moisture. Because a naked 80 gauge PLA film has a water vapor transmission rate of about 170 g/m²/day, it fails to provide the requisite moisture vapor transmission rate of less than 5 g/m²/day. Consequently, a cracked metalized coating will similarly fail to provide a film with the requisite barrier properties. However, if a nanocoating 517 is applied to a PLA layer 518b and the nanocoating is metalized, it is believed that any subsequent cracks in the metal will have substantially less impact on the barrier properties of the film because of the barrier properties provided by the underlying nanocoating.

The water vapor transmission rates of various bio-based films were recorded under various conditions and are depicted in Table 1 below. The relatively humidity of the testing conditions, temperature at which the test was conducted and the flow rate in standard cubic centimeters per minute are recorded in the table below. All PLA print web and backing web films are 80 gauge films. The term "adhesive" signifies a conventional adhesive such as ROBOND was used. A modified PLA adhesive signifies a modified PLA biopolymer 26806 from DaniMer was used. The bond strength between the print web and backing web, if measured or observed, is also provided below. An observation recorded as "Good" indicates that the layers could not be peeled apart by hand and there were no obvious air pockets or other defects. A recording with "-" indicates that no measurement or observation was recorded. A numerical number is the actual recorded bond strength in grams per inch.

Samples 1-2 demonstrate the water vapor transmission rate of an aluminum oxide coated PLA layer adhered with an adhesive layer to a PLA print web.

Samples 3-4 demonstrate the water vapor transmission rate of an aluminum oxide coating to two PLA layers.

Samples 5-12 demonstrate the water vapor transmission rate of various metalized blown PLA layers.

Samples 13-24 demonstrate the water vapor transmission rate of various biaxially oriented metalized PLA layers.

Samples 25-29 demonstrate the water vapor transmission rate of a nanocomposite coated PLA. The Nanocompsite coating used was NANOLOK 3575 from InMat Inc. Sample 29 had a coating weight of 3.6 g/m². The coating weights of the other samples were not recorded.

Samples 30-40 demonstrate the water vapor transmission rate of "naked" PLA layers without the application of any barrier protection material. A total of 160 gauge of PLA is tested in samples 32-38 and a single 80 gauge layer is tested in samples 39-40.

TABLE 1

Water Vapor Transmission Rate Measurements

| Sample No. | WVTR g/m²/day | Print Web | Adhesive Layer | Backing Web | RH (%) | T (° C.) | Q (SCCM) | Bond (g/in) |
|---|---|---|---|---|---|---|---|---|
| 1 | 31.25 | PLA | Adhesive | AlO(x) PLA | 72.80 | 37.5 | 29.70 | Good |
| 2 | 32.06 | PLA | Adhesive | AlO(x) PLA | 75.06 | 37.5 | 36.58 | Good |
| 3 | 10.34 | AlO(x) PLA | Adhesive | AlO(x) PLA | 84.25 | 37.5 | 32.25 | Good |
| 4 | 10.66 | AlO(x) PLA | Adhesive | AlO(x) PLA | 87.13 | 37.5 | 31.97 | Good |
| 5 | 9.11 | None | None | Metallized PLA (Blown) | 79.21 | 37.5 | 10.50 | n/a |
| 6 | 10.64 | None | None | Metallized PLA (Blown) | 82.54 | 37.5 | 10.69 | n/a |
| 7 | 5.14 | PLA | Adhesive | Metallized PLA (Blown) | 81.03 | 37.5 | 10.60 | Good |
| 8 | 5.95 | PLA | Adhesive | Metallized PLA (Blown) | 83.93 | 37.5 | 10.44 | Good |
| 9 | 6.12 | PLA | Adhesive | Metallized PLA (Blown) | 83.07 | 37.5 | 9.94 | Good |
| 10 | 5.29 | PLA | Adhesive | Metallized PLA (Blown) | 86.95 | 37.5 | 10.55 | Good |
| 11 | 16.87 | PLA | Modified PLA | Metallized PLA (Blown) | 90.00 | 37.5 | 10.00 | Easily peeled by hand |
| 12 | 15.26 | PLA | Modified PLA | Metallized PLA (Blown) | 90.00 | 37.5 | 10.00 | Easily peeled by hand |
| 13 | 1.13 | None | None | Metallized PLA | 80.54 | 37.5 | 10.18 | n/a |
| 14 | 0.96 | None | None | Metallized PLA | 80.03 | 37.5 | 10.25 | n/a |
| 15 | 0.49 | PLA | Adhesive | Metallized PLA | 76.72 | 37.5 | 10.22 | Good |
| 16 | 0.51 | PLA | Adhesive | Metallized PLA | 78.65 | 37.5 | 10.26 | Good |
| 17 | 0.79 | PLA | Adhesive | Metallized PLA | 79.70 | 37.5 | 10.45 | Good |
| 18 | 0.79 | PLA | Adhesive | Metallized PLA | 82.68 | 37.5 | 13.14 | Good |
| 19 | 1.12 | PLA | Adhesive | Metallized PLA | 83.65 | 37.5 | 10.44 | Good |
| 20 | 1.38 | PLA | Adhesive | Metallized PLA | 87.22 | 37.5 | 10.37 | Good |
| 21 | 0.52 | None | None | Metallized PLA | 66.61 | 30.3 | 10.84 | n/a |
| 22 | 0.42 | None | None | Metallized PLA | 67.04 | 30.3 | 10.39 | n/a |
| 23 | 1.91 | None | None | Metallized PLA | 85.53 | 35 | 10.84 | n/a |
| 24 | 2.18 | None | None | Metallized PLA | 85.85 | 35 | 10.49 | n/a |
| 25 | 2.27 | None | None | Nanocomposite coated PLA | 50.00 | 37.5 | 10.00 | 240.3 |
| 26 | 2.23 | None | None | Nanocomposite coated PLA | 50.00 | 37.5 | 10.00 | 288.1 |
| 27 | 2.09 | None | None | Nanocomposite coated PLA | 50.00 | 37.5 | 10.00 | 293.6 |
| 28 | 2.11 | None | None | Nanocomposite coated PLA | 50.00 | 37.5 | 10.00 | 311.3 |

TABLE 1-continued

Water Vapor Transmission Rate Measurements

| Sample No. | WVTR g/m²/day | Print Web | Adhesive Layer | Backing Web | RH (%) | T (° C.) | Q (SCCM) | Bond (g/in) |
|---|---|---|---|---|---|---|---|---|
| 29 | 2.34 | None | None | Nanocomposite coated PLA | 55.2000 | 37.5 | 50.70 | n/a |
| 30 | 113.54 | PLA | Modified PLA | PLA | 72.2527 | 37.8 | 86.53 | Good |
| 31 | 119.82 | PLA | Modified PLA | PLA | 76.6374 | 37.8 | 91.27 | Good |
| 32 | 131.85 | PLA | Adhesive | PLA | 71.1345 | 37.8 | 98.09 | — |
| 33 | 128.80 | PLA | Adhesive | PLA | 70.1553 | 37.8 | 99.77 | — |
| 34 | 133.97 | PLA | Adhesive | PLA | 75.3412 | 37.8 | 101.08 | — |
| 35 | 117.89 | PLA | Adhesive | PLA | 69.9762 | 37.8 | 89.42 | — |
| 36 | 123.65 | PLA | Adhesive | PLA | 73.8467 | 37.8 | 103.41 | — |
| 37 | 120.87 | PLA | Adhesive | PLA | 70.6552 | 37.8 | 89.95 | — |
| 38 | 128.94 | PLA | Adhesive | PLA | 73.3303 | 37.8 | 99.40 | — |
| 39 | 167.40 | none | none | PLA | 67.5000 | 30.3 | 100.00 | — |
| 40 | 167.60 | none | none | PLA | 67.5000 | 30.3 | 100.00 | — |

The above table is useful for showing the relative barrier effectiveness of various bio-based multi-layer film combinations. For example, a nanocoated PLA sheet has a WVTR of approximately 2 g/m²/day (at 55% RH and 37.5° C.), as shown by samples 25-29 above. By comparison, two tests of an uncoated 80 gauge PLA TE70C sheet from SKC of South Korea revealed a WVTR of approximately 170 g/m²/day (at 67.5% RH and 30° C.), as shown by samples 39-40 above.

Assuming a metalized nanocoated PLA sheet has a WVTR of 0.2 g/m²/day, and given that the metalized PLA sheet has a WVTR of about 1.0 g/m²/day (see samples 21-24 above), and given that a naked PLA sheet has a WVTR of about 170 g/m²/day, it becomes apparent that even if a portion of a metalized nanocoated PLA sheet has cracks in the metal coating, the WVTR through the nanocoated cracked areas is substantially less through the nanocoated sheet (at 2 g/m²/day) than through the naked PLA, sheet (at 170 g/m²/day).

Using the above data, a simplified hypothetical example can be posited that to demonstrate the belief of the synergistic effectiveness of one embodiment of the claimed invention. Its believed that a metalized nanocoating will provide surprisingly synergistic results than either coating alone because it is believed that the metalized nanocoated PLA sheet will have less cracking than a metalized PLA sheet (e.g., with no nanocoating) because of the physical properties of the nanocoating. Its believed that a nanocoating of layered silicate platelets, for example, will not crack and are able to absorb some or all of the expansion of the underlying hydroscopic PLA layer (due to humidity, etc.) thereby reducing the amount of expansion exerted on the metalized layer and thereby reducing or eliminating cracking of the metalized layer. In one embodiment, the nanocoating comprises an oxygen or moisture scavenger, such as iron powder and such scavenger can serve to inhibit moisture absorption and subsequent expansion of the PLA film.

In one embodiment, more than one nanocoating is applied to the multilayer film to obtain an additive barrier effect. For example, referring to FIG. 5b, in one embodiment a second nanocoating (not shown) can be applied between the ink layer 514 and the modified PLA layer 515b. In one embodiment, a nanocoating can be applied on the outer side of the bio-based film 502 as an overlacquer. In one embodiment, a nanocoating is applied between the metal layer 516b and the adhesive layer 515b. In one embodiment, a nanocoating is applied oil the product side of the bio-based layer 518b.

In embodiment depicted in FIG. 5b, the present invention provides a bio-based multi-layer film comprising three bio-based film layers wherein the multi-layer film has over 80% less polyolefins than the prior art film depicted in FIG. 1 yet comprises acceptable oxygen and moisture barrier properties.

The present invention provides numerous advantages over traditional, petroleum-based prior art films. First, the present invention reduces consumption of fossil fuels where the bio-based layer is being used for one or more layers of the film that previously required a petroleum-based/fossil-fuel based polypropylene polymer. In the embodiment where PCR is used as a film layer, the film of the present invention is made with both a renewable and a recycled resource.

Second, the present invention lowers the amount of carbon dioxide in the atmosphere because the origin of the bio-based films is plant-based. Although the bio-based film can degrade in a relatively short period of time under composting conditions, if the film is placed into a landfill the carbon dioxide is effectively sequestered away and stored because of the lack of light, oxygen, and moisture available to degrade to the film. Thus, the carbon dioxide that was pulled from the atmosphere by the plant from which the bio-based film was derived is effectively placed into storage. Further, in one embodiment, if the PCR paper comprises more than 80% of PCR fiber by weight, more carbon dioxide is sequestered from the atmosphere than is used to make the PCR paper. Consequently, the present invention can be used to provide a carbon dioxide sink for greenhouses gases.

Third, less litter is visible because a portion of the film making up the resultant package is biodegradable. As used herein, the term "biodegradable" means that less than about 5% by weight and preferably less than about 1% of the film remains after being left at 35° C. at 75% humidity in the open air for 60 days. Those skilled in the art will understand that at different ambient conditions, it may take longer for the film to degrade. By comparison, an OPP film can last more than 100 years under these same conditions. Unlike petroleum-based films, bio-based films easily degrade. PCR paper, for example, is made up of cellulose molecules, which can be degraded through hydrolytic degradation (upon exposure to water), oxidative degradation (upon exposure to oxygen), and thermal degradation (upon exposure to heat). All of these sources of degradation are available in the open environment. Consequently, one benefit of the present invention is that the amount of unsightly litter degrades more quickly.

Fourth, the film of the present invention can be produced using the same existing capital assets with only minor modifications that are used to make prior art films.

Fifth, energy is conserved because it takes less energy to create a film in accordance with the present invention than prior art petroleum based flexible films. For example 1 kg of PLA requires only 56 megajoules of energy, which is 20% to 50% fewer fossil resources than required to make petroleum-based plastics such as polypropylene.

Sixth, the invention provides more stable and less volatile pricing. Unlike petroleum-based commodities which fluctuate widely based upon the price of oil, bio-based commodities are more stable and less volatile. Further, bio-based films have the potential to benefit from continual improvements in genetically-engineered plants that can increase the desired feedstock composition and yield.

As used herein, the term "package" should be understood to include any container including, but not limited to, any food container made up of multi-layer thin films. The sealant layers, adhesive layers, print webs, and barrier webs as discussed herein are particularly suitable for forming packages for snack foods such as potato chips, corn chips, tortilla chips and the like. However, while the layers and films discussed herein are contemplated for use in processes for the packaging of snack foods, such as the filling and sealing of bags of snack foods, the layers and films can also be put to use in processes for the packaging of other low moisture products. While this invention has been particularly shown and described with reference to a preferred embodiment, it will be understood by those skilled in the art that various changes in form and detail may be made therein without departing from the spirit and scope of the invention.

We claim:

1. A multi-layer packaging film comprising:
   a) an outer layer comprising a first bio-based film;
   b) an adhesive layer adjacent to said outer layer; and
   c) a product side layer comprising a second bio-based film having a nanocoating between said product side layer and said adhesive layer to provide barrier properties, wherein said multi-layer packaging film comprises a moisture vapor transmission rate of less than about 5 g/m2/day.

2. The film of claim 1 wherein said adhesive layer comprises a third bio-based film.

3. The film of claim 2 wherein said first, said second or said third bio-based film comprises polylactide.

4. The film of claim 2 wherein said first, said second or said third bio-based film comprises polyhydroxy-alkanoate.

5. The film of claim 2 wherein said first bio-based film, said second bio-based film, and said third bio-based film comprise a total weight of bio-based film which is at least 90% of said multi-layer packaging film by weight.

6. The film of claim 2 wherein said first, said second or said third bio-based film comprises between about 1% and about 65% starch by weight of the film.

7. The film of claim 2 wherein said first, said second or said third bio-based film further comprises a stearate additive.

8. The film of claim 1 further comprising a metalized layer between said nanocoating and said adhesive layer.

9. A snack food package made from a multi-layer flexible film having barrier properties, said multi-layer flexible film comprises:
   an outer layer comprising a first bio-based film layer;
   an adhesive layer adjacent to said outer layer; and
   a product side layer comprising a second bio-based film layer having a nanocoating between said product side layer and said adhesive layer to provide barrier properties, wherein said multi-layer packaging film comprises a moisture vapor transmission rate of less than about 5 g/m2/day.

10. The snack food package of claim 9 wherein said first bio-based film layer comprises an ink layer .

11. The snack food package of claim 9 wherein said first bio-based film layer comprises a barrier layer.

12. The snack food package of claim 9 wherein said second bio-based film layer further comprises PCR paper.

13. The snack food package of claim 9 further comprising a metalized layer between said nanocoating and said adhesive layer.

* * * * *